(12) United States Patent
D'ambrosio et al.

(10) Patent No.: US 9,172,722 B2
(45) Date of Patent: Oct. 27, 2015

(54) METHOD FOR NETWORK ACCESS, RELATED NETWORK AND COMPUTER PROGRAM PRODUCT THEREFOR

(75) Inventors: Matteo D'ambrosio, Turin (IT); Mario Ullio, Turin (IT); Vinicio Vercellone, Turin (IT)

(73) Assignee: Telecom Italia S.p.A., Milan (IT)

( * ) Notice: Subject to any disclaimer, the term of this patent is extended or adjusted under 35 U.S.C. 154(b) by 888 days.

(21) Appl. No.: 12/990,409

(22) PCT Filed: Apr. 30, 2008

(86) PCT No.: PCT/EP2008/003495
§ 371 (c)(1),
(2), (4) Date: Oct. 29, 2010

(87) PCT Pub. No.: WO2009/132666
PCT Pub. Date: Nov. 5, 2009

(65) Prior Publication Data
US 2011/0047612 A1   Feb. 24, 2011

(51) Int. Cl.
*H04L 29/06* (2006.01)
*H04W 12/08* (2009.01)

(52) U.S. Cl.
CPC ............ *H04L 63/164* (2013.01); *H04W 12/08* (2013.01)

(58) Field of Classification Search
CPC ..... H04L 63/20; H04L 63/162; H04L 63/164; H04L 63/08; H04L 63/123; H04L 63/0428; H04L 12/2856; H04L 65/1009; H04L 12/2898; H04W 36/0038
See application file for complete search history.

(56) References Cited

U.S. PATENT DOCUMENTS

| | | | |
|---|---|---|---|
| 7,028,183 B2 | 4/2006 | Simon et al. | |
| 2001/0050911 A1* | 12/2001 | Eastman | 370/352 |

(Continued)

FOREIGN PATENT DOCUMENTS

EP    1404143 A2    3/2004

OTHER PUBLICATIONS

C. Perkins, "IP Mobility Support for IPv4", IETF RFC3344, Aug. 2002.

(Continued)

*Primary Examiner* — Shewaye Gelagay
*Assistant Examiner* — Carlton Johnson
(74) *Attorney, Agent, or Firm* — Banner & Witcoff, Ltd.

(57) ABSTRACT

A method of providing access of a mobile terminal to an IP network includes establishing a security association between the mobile terminal and a first security gateway of a first router in said plurality of routers. The mobile terminal is provided access to the IP network via the first router, and the data exchanged between the mobile terminal and the first router is encapsulated by using the security association. The security association is made available to at least one second router having a second security gateway. The mobile terminal is provided access to the IP network via said the second router, and data exchanged between the mobile terminal and the second router is encapsulated by using the same security association. Establishing the security association includes assigning a Security Parameter Index that identifies univocally the first security gateway and the security association. Making the security association available to the second router includes making available to the second router the Security Parameter Index. The second router may thus have access to the security association either by requesting it from the first router or by identifying it in a set of security associations sent from the first router to a set of routers candidate to become the second router as result of the mobility of the mobile terminal.

19 Claims, 2 Drawing Sheets

(56) References Cited

U.S. PATENT DOCUMENTS

Figure 1:
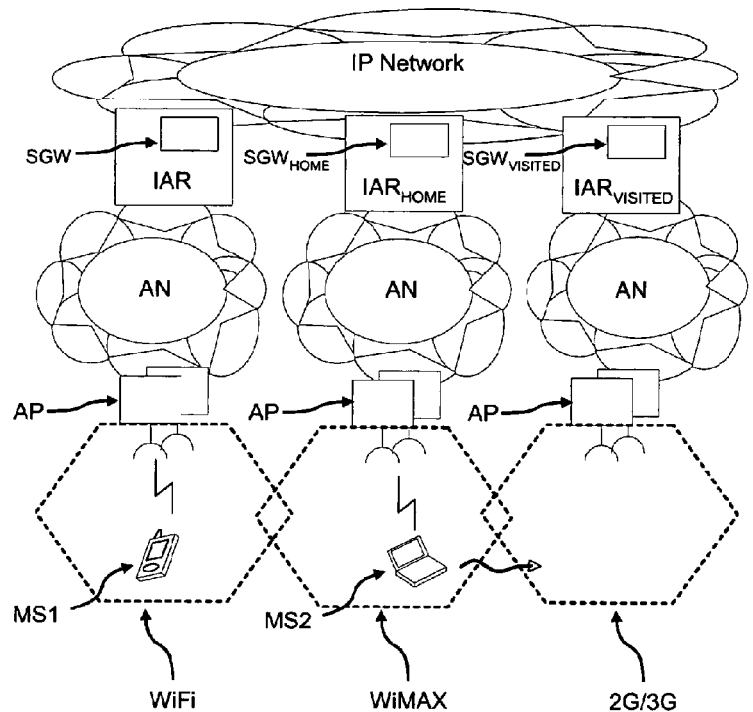

| | | | |
|---|---|---|---|
| 2002/0165990 A1 | 11/2002 | Singhal et al. | |
| 2003/0233568 A1* | 12/2003 | Maufer et al. | 713/200 |
| 2004/0003280 A1 | 1/2004 | Narayanan et al. | |
| 2004/0097232 A1 | 5/2004 | Haverinen | |
| 2004/0221296 A1* | 11/2004 | Ogielski et al. | 719/313 |
| 2005/0164729 A1* | 7/2005 | Narayanan et al. | 455/522 |
| 2006/0252438 A1* | 11/2006 | Ansamaa et al. | 455/503 |
| 2007/0234036 A1 | 10/2007 | Tan et al. | |
| 2008/0075073 A1* | 3/2008 | Swartz | 370/389 |
| 2008/0162924 A1* | 7/2008 | Chinitz et al. | 713/153 |

OTHER PUBLICATIONS

International Search Report Mar. 5, 2009, PCT/EP2008/003495.

* cited by examiner

METHOD FOR NETWORK ACCESS, RELATED NETWORK AND COMPUTER PROGRAM PRODUCT THEREFOR

CROSS REFERENCE TO RELATED APPLICATIONS

This is a U.S. National Phase Application under 35 U.S.C. §371 of International Application No. PCT/EP2008/003495, filed Apr. 30, 2008, which was published Under PCT Article 21(2), the entire contents of which are incorporated herein by reference.

FIELD OF THE INVENTION

This disclosure relates to techniques for providing access in communication networks. Specifically, this disclosure relates to managing the mobility of data/voice communication terminals, with a view to providing integrated F/M (Fixed/Mobile) access to an Internet Protocol (IP) based network. Reference to this possible field of application is not however to be construed in a limiting sense of the scope of this disclosure.

DESCRIPTION OF THE RELATED ART

The problem of transferring communications from/to a mobile terminal from an access point/network to another has been already tackled in the past, and a number of solutions have been provided.

For instance, MIP (Mobile IP), as specified in IETF RFC3344 (see Perkins, C., "IP Mobility Support for IPv4", IETF RFC-3344, August 2002) allows an IP terminal to move from an IP access sub-network to another, without solutions of continuity (i.e. without breaks or interruptions).

These solutions maintain activity of the IP access session as initially established, even when the terminal is no longer in the area of coverage of the home access router, by rerouting the traffic to the home node.

Document U.S. Pat. No. 7,028,183 describes a technique to support secure communication based on the IPSec protocol in a clustered or distributed architecture, i.e. a network architecture including a plurality of edge routers that process the Encapsulating Security Payload (ESP) and/or the Authentication Header (AH) of a Internet Protocol Security (IPSec) tunnel on behalf of a multiplicity of end nodes. This document also describes certain procedures for distributing Security Association (SA) parameters negotiated by the end node and installing them on a plurality of edge routers. In that way the end node may move in a seamless way through the net by maintaining secure communication, that is by maintaining the SA as originally established. This document also mentions the case of a wireless access network, where additional procedures can be used for propagating, upon request, the SA information among the edge routers, thus allowing seamless roaming of the end nodes.

Document US2002/0165990 A1 discloses an arrangement wherein mobility is related to functional entities such as "home agent" and "foreign agent" entities, i.e. a mechanism of the Mobile IP type.

OBJECT AND SUMMARY OF THE INVENTION

The applicant has noted that, despite certain advantages, the arrangements described in the foregoing inevitably suffer from some basic drawbacks.

For instance, they may imply the necessity of rerouting the traffic to the node Home, and/or require a new installation phase of an IPSec session to effect a handover between different access routers.

Also, they may require the execution and the exchange of protocol messages among various edge routers and/or may always require reference to a centralized repository (associated to the cryptographic node that manages the initial set-up of the Security Association).

Additionally, in an actual Internet environment, it may be necessary for the terminal to change its IP address, which would result in the TCP/UDP (Transport Control Protocol/User Datagram Protocol) sessions previously established being dropped: this will happen because the sessions are identified (also) via the IP addresses of the end-points of communication.

The object of the invention is thus to provide an improved arrangement which, may be exempt from those drawbacks.

According to the present invention, that object is achieved by means of a method having the features set forth in the claims that follow. The invention also relates to a corresponding network as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The claims are an integral part of the disclosure of the invention provided herein.

An embodiment of this disclosure is a network node, hereinafter referred to as an Integrated Access Router (IAR); such a node includes functional elements for controlling the access to an IP network and routing the data and voice traffic of mobile and fixed terminals.

In an embodiment, terminal mobility may be managed without solutions of continuity (i.e. any break) as the mobile terminal moves between different access points (APs), such as e.g. unlicensed radio technology APs (Bluetooth, WiFi 802.11, WiMAX) or 2G/3G radio technology APs (GERAN/UTRAN). IP-based voice calls or data communications may thus be transferred from a network to another in a manner which is fully transparent (seamless) to the user.

In an embodiment, the architecture of the IAR node may include an element with the role of Security Gateway (SGW); the standard functionalities for managing the IPSec protocol associated with that element may be implemented by resorting to arrangements which permit to maintain active, without interrupting the on-going session(s) of a terminal as the terminal moves from an access area to another, i.e. from an IAR access node to another.

In an embodiment, the arrangement disclosed herein is capable of managing the context related to a secure access session to the IP network as established by the mobile terminals.

In an embodiment, the arrangement disclosed herein is capable of managing in a seamless and substantially transparent way the transfer of a secure access connection to the IAR node as the terminal moves from an access node to another. A related re-configuration procedure may be largely independent of the underlying radio technology and may not require any change to the standard terminals.

In an embodiment, the arrangement disclosed herein is capable of notionally maintaining a steadily active access connection of a terminal to the same Security Gateway and an initial IAR node.

In an embodiment, the arrangement disclosed herein may be integrated with standard techniques for supporting mobility at the network layer.

In an embodiment, a tunneling mechanism based on the ESP IPSec protocol may be used to provide the access connection of the terminal to the IP network, so that access node termination may not necessarily take place on a given node (Home node, as in the case of conventional solutions such as e.g. Mobile IP, 2G/3G, etc.), but rather take advantage of a Security Gateway function distributed over the IAR access nodes of the provider.

In an embodiment, the tunnel encapsulation mechanism may lead to assigning an innermost address which kept fixed, irrespective of any changes in the access sub-network, thus playing the role of identifying the terminal in the sessions which are kept active during the terminal mobility. This makes it possible to avoid having to re-establish a new ESP IPSec session as the access node changes by moving also the session context, which is completely transparent to the mobile terminal.

In an embodiment, the arrangement disclosed herein based on the use of the ESP IPSec protocol may be integrated with a mechanism of managing IP mobility and secure network access based on routing techniques and particularly on the dynamic announcement of the host-specific prefixes assigned to the terminals by the access nodes visited thereby (these host-specific prefixes are currently referred to as "/32" prefixes in the Ipv4 protocol).

Various embodiments of the arrangement disclosed herein are adapted for managing network layer mobility in a scenario of fixed/mobile integration. This may apply in particular to the management of the mobility within a same administrative net domain (intra-domain), possibly involving the adoption of dynamic announcement of the host-specific prefixes (e.g. "/32" prefixes, IPv4) assigned to the terminals, in conjunction with the Security Association (SA) IPSec context being made available in a seamless manner to a plurality of access routers.

This disclosure foresees the possible use of certain procedures to manage in a simple and efficient way those operations involved in making the context available in a seamless manner to a plurality of edge routers. In an embodiment, this involves a mechanism of creating a structure and assigning an SPI identifier for the Security Association; the router will thus be able to immediately determine, by analysing a field in that identifier, the edge router (e.g. home IAR node) from which the context may be made available.

The disclosure herein provides a general integrated (fixed/mobile) access technique to an IP network which is adapted for use with a variety of possible access configurations and technologies.

BRIEF DESCRIPTION OF THE ANNEXED DRAWINGS

Figure 3:
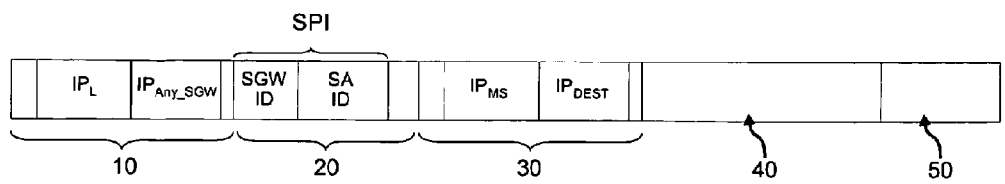
Figure 2A:
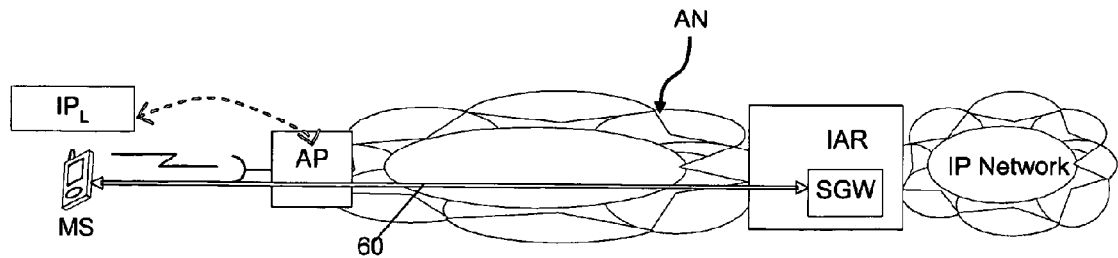
Figure 2B:
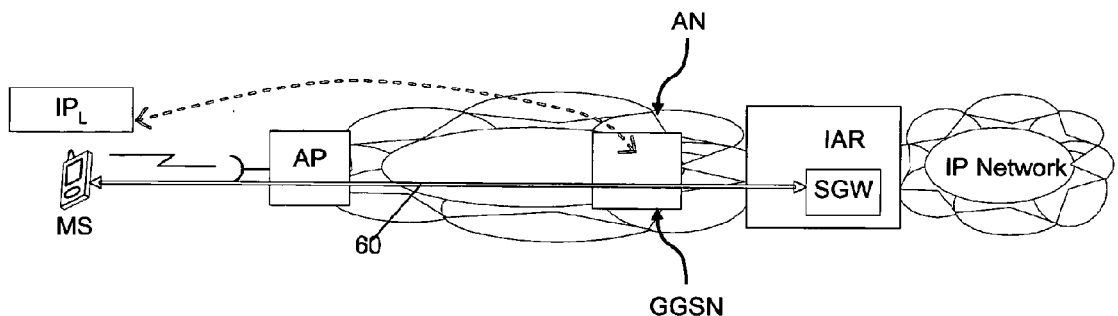
Figure 2C:
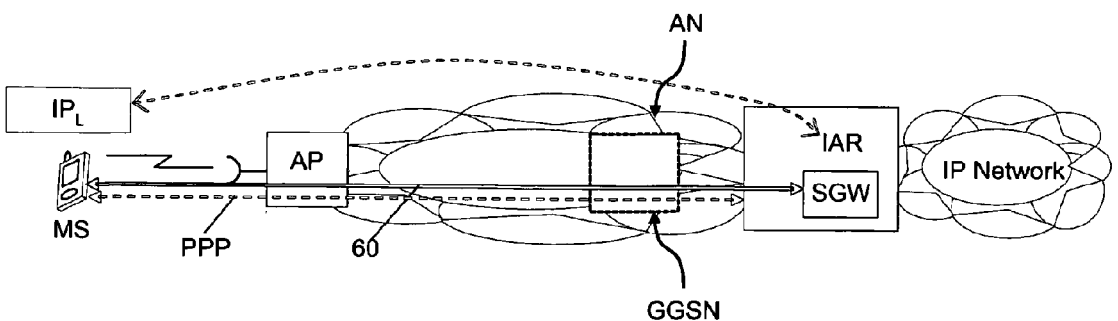

The invention will now be described, by way of example only, with reference to the enclosed figures of drawing, wherein:

FIG. 1 shows a typical multi-access network scenario;
FIGS. 2a to 2c show possible communication links; and
FIG. 3 shows an IPSec data packet.

DETAILED DESCRIPTION OF PREFERRED EMBODIMENTS

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

As mentioned in the foregoing, the arrangements disclosed herein are particularly suitable for a multi-access network scenario, such as shown in FIG. 1.

A multi-access network may include both mobile and fixed networks, such as e.g. Wireless Fidelity (WiFi), Worldwide Interoperability for Microwave Access (WiMAX), or 2G/3G networks, and Local Area Networks (LAN) connected over a Digital Subscriber Line (DSL) to the Internet. By way of example, FIG. 1 shows a scenario comprising WiFi, WiMAX and 2G/3G networks with their associated access networks, which have access a common IP network, such as the Internet.

In the network architecture as considered herein, not only horizontal handoffs—such as a transfer of the communication of a mobile terminal MS1 from an WiFi access point AP to another—but also handoffs between different networks—such as a transfer of the communication of a mobile terminal MS2 from a WiMAX access point to 2G/3G access point (i.e. base station or Node B)—may occur. Moreover, such handoffs may involve a single operator (i.e. handover) or also different operators (i.e. roaming).

According to this disclosure, an ESP IPSec tunnel may be established to a Security Gateway (SGW), which may form part of an Integrated Access Router (IAR). Such IPSec tunnel may provide a homogeneous access model independent from the underlying network technologies, which may be completely different. Specifically, the IP connection over the local IAR/SGW node is maintained or re-established automatically during the movement of the mobile terminal and the procedure is completely transparent to the user/mobile terminal.

Those skilled in the art will appreciate that such an IPSec tunnel has also the advantage that communication over "vulnerable" radio technologies (e.g. WiFi) is protected against possible intrusion and/or interceptions.

Various embodiments as described herein have the ability to maintain end-to-end communication sessions during the movement of the terminal, even in the case of a movement between access nets with different IAR/SGW nodes. In this case mobility is usually designate as macro-mobility or network layer mobility.

In an embodiment, network layer mobility is supported through a management of the advertisement (announcement) mechanism of the terminal address.

For example a dynamic IP address pool may be defined and IP addresses may be assigned, which are "persistent" to a change of the routing area. In this case, if a terminal is not found in the area of coverage of the home access router, the specific addresses assigned to the mobile terminal are announced with the IP intra-domain routing protocols. Therefore, such addresses are "persistent" even though the address are assigned dynamically from the address pool, which is managed by the Home access node, because they are announced by the node that is currently responsible for the IP access of the terminal.

In an embodiment, this is achieved by announcing the host-specific (e.g. "/32") prefix of the mobile terminal (i.e. the sub-net containing only the IP address of the mobile terminal) by the responsible access node, i.e. the visited access node when the terminal is not found in the Home access area.

The number of host-specific prefixes which have to be announced explicitly in the intra-domain routing protocol are typically less than a few thousands. This number may even be reduced by suitable network optimizations such as intervening in opportune way on the aggregation of addresses, the dimension of the IAR nodes and the access areas.

In an embodiment, the mechanism above is used in conjunction with the Mobile IP (MIP) protocol, which permits also a management of mobility on a network layer.

FIGS. 2a to 2c illustrate some examples of an IPSec tunnel set up with different access technologies.

Specifically, FIG. 2a shows how an IPSec tunnel 60 may be established with a typical WiFi/WiMAX access network.

In such a network, the mobile terminal establishes a connection to an access point AP. The access point AP forwards then the traffic through a suitable access network AN to an Integrated Access Router (IAR), which e.g. allows in turn access to a public IP network.

Those skilled in the art will appreciate that the access network may be any communication network, such as e.g. Ethernet or fibre optics, including also wireless networks. Moreover, especially in the case of WiFi/WiMAX access points, the IAR may even be included in the AP, without requiring an extra access network.

In the exemplary embodiment shown, the IAR comprises hardware or software modules (Security Gateway) responsible for the establishment and management of a Security Association with the mobile terminal MS via the IPSec protocol.

Such a Security Gateway SGW may be implemented on the IAR node through one or more specialized modules, which manage the traffic of the IPSec tunnels. Such modules may be integrated in the IAR by means of one or more router interfaces mounted in expansion slots typically available in an IAR. In this case traffic coming from the line interfaces of the router and destined to the SGW unit(s) may be routed internally by the IAR node, exploiting the internal switching fabric. Additionally, such hardware modules may be controlled by one or more software or hardware components on the IAR node.

In an embodiment, the Security Gateway SGW may be implemented on the IAR node as an additional software module. This implementation may be suitable if performance requirements for the elaboration of the IPSec protocol are not particularly elevated.

Those skilled in the art will appreciate that also mixed software/hardware implementation may be used. For example, additional software components may be required if the additional hardware modules or the IAR node (e.g. the network processor or the forwarding engine) are only able to elaborate the IPSec protocol in native way. Such SGW modules and the IPSec procedures are well known in the art, rendering a more detailed description herein unnecessary.

Preferably, the ESP protocol of the IPSec suite may be used, as this allows modifying the origin address in the external header of the tunnel without invalidating the session. Moreover, ESP may be used in the tunnel mode, which allows complete encapsulation of IP application packets of the mobile terminal.

In order to access the IAR node, and more specifically the Security Gateway SGW, an IP connection is established, and consequently an IP address, designated in the following as $IP_L$, is assigned to the mobile terminal. Such an IP address may be fixed or dynamically assigned to ensure enough connectivity to contact the IP address of the SGW. For that purpose the IP address $IP_L$ may also be only a local IP address, which per se has no connectivity to the public IP network.

In the example shown in FIG. 2a, the IP address $IP_L$ is assigned directly by the AP, which supports layer 3 functions.

Subsequently, the mobile terminal is able to contact the IP address associated to the SGW and establish the IPSec Tunnel 60.

FIG. 2b shows an analogous configuration at the example of a possible 2G/3G communication link, wherein the AP represents the base-station and the traffic of the mobile terminal passes typically through a Gateway GPRS Serving/Support Node (GGSN). In this case the IP address $IP_L$ may be assigned by the GGSN node.

FIG. 2c shows a further example, wherein both the AP and the GGSN support only layer 2 functions. In such a case the IP address $IP_L$ may be assigned by the IAR node. For this purpose a Point-to-Point Protocol (PPP) session may be established, such as a PPP link between the mobile terminal and the IAR node.

In the above examples, the IP address is assigned dynamically and, consequently, a movement of the mobile terminal to another access point may cause a re-assignment of a new IP address $IP_L$.

Those skilled in the art will appreciate that any communication link and access network may be used in order to establish a data connection between the mobile terminal and the SGW node. Moreover, any IP assignment mechanism may be used in the case of an IP connection between the mobile terminal and the SGW node.

Subsequent to the assignment of the IP address $IP_L$, the mobile station MS contacts the Security Gateway (SGW) and starts the usual procedures for establishing an ESP IPSec tunnel 60. During such operation the mobile station MS may receive also a second IP address $IP_{MS}$, which has access to the public IP network.

According to this disclosure, the IP address $IP_{MS}$ will remain unchanged even after a possible handoff resulting e.g. from a movement of the mobile station. Therefore, the IP address $IP_{MS}$ may be used to identity the mobile terminal on a network layer.

At the end of the IPSec tunnel setup process, the SGW memorizes the information related to the IPSec session in a database, designated Security Association Database (SAD) and Security Policy Database (SPD). The elements of the aforesaid database related to the IPSec session may be identified through a Security Parameter Index (SPI) assigned to the same session. According to the IPSec protocol, the parameter SPI is comprised of a 32-bit field assigned in arbitrary way by the SGW node.

In the exemplary embodiments described in the following, the SA (i.e. the IPSec tunnel) is maintained active (always-on) in a way which is substantially transparent to the mobile terminal, even if the IAR node (and the associated SGW) may change. This means that the SGW nodes which are distributed in the network behave as a single "virtual" Security Gateway.

This is achieved by associating to the different SGW, according to a routing principle commonly known as "anycast", the same IP address $IP_{Any\_SGW}$.

According to this disclosure the network operator may manage the SA associated to the mobile terminal in an appropriate manner in order to avoid that the mobile terminal has to re-establish the IPSec tunnel. For example, the SA may be transferred to or reproduced (i.e. duplicated) on the new SGW: this operation may be performed on request or in a predictive manner.

The following is a description of an exemplary way of making SA available to a new SGW by transfer or replication.

As explained in the foregoing, the mobile station MS may receive two IP addresses ($IP_L$ and $IP_{MS}$) and establish a SA with the SGW associated to the Home IAR node. In such case the IP packets sent by the mobile station MS to a generic destination having the IP address $IP_{DEST}$ will have $IP_{MS}$ and $IP_{DEST}$ as the source address and the destination address, respectively. According to the ESP IPSec protocol the packet will be encapsulated having $IP_L$ and $IP_{Any\_SGW}$, respectively, in the external header.

FIG. 3 shows in that respect an exemplary encapsulation scheme for the packets transmitted on the ESP IPSec Tunnel between the MS and the SGW.

Specifically, such an encapsulation scheme might be used to transmit a data packet comprising an IP header 30 having as source address $IP_{MS}$ and as destination address $IP_{DEST}$, and the payload 40. This data packet is then encapsulated by encrypting the payload 40 and encapsulating the data packet in a new IP packet. This is achieved by adding an external IP header 10 having as source address $IP_L$ and as destination address $IP_{Any\_SGW}$, and the mentioned Security Parameter Index SPI which forms part of the ESP IPSec Header 20. In the example shown, the SPI value has a dedicated field for the security gateway identification "SGW ID" and a dedicated field for the security association identification "SA ID". According to the IPSec specification such an encapsulated data packet might also have an EPS trailer 50.

If the mobile station MS moves now to a new AP, the mobile station may receive a new IP address $IP_L$, designated in the following $IP_{L\_NEW}$. However, this IP address is only used for the communication over the IPSec tunnel and not for the communication with the public IP network.

In the simplest case, the IAR node, which receives the traffic from the MS over the new AP is again the Home IAR node. Consequently the packets are received and processed by the same SGW that has initially established the SA.

Conversely, if the terminal has moved to an AP served by a different IAR node, designated in the following $IAR_{VISITED}$, the traffic transmitted by the MS will be received by a different SGW having the same IP address $IP_{Any\_SGW}$. This procedure is completely transparent to mobile station MS.

The new SGW begins therefore to receive packets coming from the mobile terminal connected to the new IAR node. As mentioned in the foregoing, the IPSec communication will contain again the SPI field as pointer to the SA database.

In order to maintain the pre-existing IPSec session the parameters of the related SA are communicated (i.e. made available) to the new $SGW_{VISITED}$.

For this purpose, the new $SGW_{VISITED}$ may request a transfer or replication of the SA from the $SGW_{Home}$. Alternatively, the new $SGW_{VISITED}$ may already contain a copy of the SA that has been replicated previously on candidate SGW due to a predictive strategy.

In an embodiment, this mechanism is optimized by assigning suitable SPI values, which identify the SA.

According to the IPSec protocol, the SPI value is assigned in an arbitrary way and is of local validity only. Nevertheless, the SPI values may be selected in a suitable way, which may identify univocally the SA established by different terminals with the SGWs of the network. This can be achieved by assigning SPI values which have global validity at least within the same network domain. For example, the 32 bits of the SPI string may be structured in order to contain a dedicated space for identifying the $SGW_{Home}$ node (i.e. the node which has assigned the SA to the mobile terminal).

According to this criterion, other SGW nodes are therefore able to determine if the SPI belongs to their own identification spaces. If the SPI has been assigned by the same SGW node (i.e. the $SGW_{HOME}$ node), the value is used to seek the relative SA in the database containing the "local" SA. Conversely, if the SGW determines that the SPI has been assigned by another node, the SGW node searches the SA in the database related to terminals connected to the net as "Visited". If this search fails, the SGW establishes that the terminal is implicitly starting a handover and requests, through opportune procedures, the SA for the session related to the MS from the $SGW_{HOME}$ node, which can be identified by the SPI value.

In an embodiment, the SGW node may memorize also the IP address $IP_{MS}$ assigned to the terminal. The IP address $IP_{MS}$ may then also be sent to the new $SGW_{VISITED}$ during the transfer or replication of the SA.

In an embodiment, the $SGW_{VISITED}$ node determines the IP address $IP_{MS}$ directly from the encapsulated data packet received from the mobile terminal. In this case the $SGW_{VISITED}$ node uses the transferred or replicated SA to decode the encapsulated data packets, which contains in the IP header 30 also the IP address $IP_{MS}$ of the mobile terminal.

Once the necessary information has been inserted in the database, the $SGW_{VISITED}$, knowing the IP address representing the network identity of the mobile terminal, is able to forward correctly the traffic to the MS.

In an embodiment, the IAR node announces this IP address as a host-specific (e.g. "/32") prefix, namely the subnet containing only the IP address $IP_{MS}$ with the intra-domain routing protocol in order to guarantee the correct routing of the traffic from the network toward the MS. This allows also the on-going application sessions to be maintained by re-directing the traffic to MS through the $IAR_{VISITED}$ node rather than through the $IAR_{HOME}$ node.

In fact, the announcement of the host-specific prefix may be effected only starting from the $IAR_{VISITED}$ node, while for the node $IAR_{HOME}$ it is typically sufficient to announce only the sub-net of the IP pool from which the IP address $IP_{MS}$ has been assigned. Those skilled in the art will appreciate that usually explicit host-specific routes prevail over any sub-net routes (i.e. rule of the longest prefix matching).

Accordingly, when the mobile terminal moves from an $IAR_{VISITED}$ to another $IAR_{VISITED}$, the first IAR node will eliminate the announcement of the host-specific prefix of MS, while a new announcement will be started by the second node. For this purpose, the new IAR node may notify (e.g. when the SA context is activated on the SGW of the new IAR) a handover of the mobile terminal to the preceding IAR node.

In order to identify the address of the preceding IAR node such information is stored in the context of the MS managed by the $IAR_{HOME}$ node. For this purpose, every $IAR_{Visited}$ node, which establishes communication with a mobile terminal, will communicate such information to the $IAR_{HOME}$ node.

Instead of using the announcement of a host-specific (e.g. "/32") prefix, an embodiment may foresee the usage of the Mobile IP protocol in order to manage mobility. In this case, the $IAR_{VISITED}$ node performs the role of a "Foreign Agent" and the $IAR_{HOME}$ node the role of "Home Agent" as specified in the MIP architecture.

In an embodiment, the two techniques may be used in combination. For example, the host-specific prefix announcing mechanism is used by default and the MIP technique is used if the number of host-specific prefixes announced exceeds a predetermined threshold.

As mentioned previously, an embodiment may use a "predictive" strategy. In this case, the information of active contexts, or rather the SA and related additional information (e.g. the related IP address $IP_{MS}$ if stored in the database) are replicated and installed in advance in the database of the SGW serving adjacent routing areas. Such nodes are in fact possible candidates for a handover operation from the current IAR node.

The candidate IAR nodes may e.g. be derived from network planning information, which are usually available to the IAR or SGW nodes, which are therefore able to replicate in a proactive manner the context and related information.

In an embodiment, the candidate IAR/SGW nodes that receive a replica of the information of the context, are those nodes which serve radio access areas in "contiguity" of the area currently visited by the mobile terminal. A "contiguity" existing between two areas means that their radio coverage areas overlaps partially or entirely (for instance in the case of a WiFi hot-spot inside a 2G/3G radio cells).

Using a predictive strategy guarantees at the moment of a handover that the mobile terminal MS will already find on the new node the necessary information for managing correctly the related traffic.

In an embodiment, the new IAR/SGW node will then inform the old IAR/SGW node that context information may be deleted. For example, the old IAR/SGW node may inform the previous candidate nodes (i.e. those having received previously replicates of the context information) to delete the replicas/duplicates. The new IAR/SGW node will then identify new candidate nodes and transmit a replica of the context to them.

Disconnection of a mobile terminal from the network may occur explicitly or implicitly.

In the former case, the mobile station MS will notify the SGW with a "Context Release" message. The node SGW receiving such message will cancel the partnership context to such terminal and, if the node does not coincide with the $IAR_{HOME}$ node, it may notify in turn the $IAR_{HOME}$ node that it can remove also the original context.

Implicit disconnection may occur e.g. when no activity takes place for a mobile terminal over a predetermined period of time. In this case, the node $IAR_{VISITED}$ may remove the mobile station's context, also notifying the $IAR_{HOME}$ node for a cancellation of the original context. For example this may occur when a timer responsive to user's traffic or "Keepalive" packets, expires.

A periodic exchange of "Keepalive" packets between the terminal and the net (e.g. the anycast address $IP_{Any\_SGW}$) may be preferable in order to maintain the sessions with mobile terminals active. This allows the mobile terminal to remain connected even in the absence of traffic, or to activate the routing and SA context when a "silent" terminal moves to a new IAR node.

In the latter case, the presence of Keepalive traffic in the IPSec tunnel will allow the terminal to hook to the new SGW, which activates the associated SA context in order to guarantee a correct delivery of IP packets from the network to the mobile station.

Conversely, lack of receipt of a certain number of consecutive Keepalive packets from a mobile terminal may cause an interruption of the connection and a cancellation of the relative contexts.

In the following some exemplary procedures are described for the management of the sessions of the mobile terminals in the case of "persistent" IP addresses (i.e. using a "/32" prefix announcing mechanism).

Activation of a Secure Context for an Access to the Network of the Provider

The mobile station MS (not yet connected to the network) connect to an access node AP with layer 3 functions and, after being authenticated, receives a valid IP address $IP_L$, which may also be a private IP address according to RFC1918.

The MS connects to the any cast address $IP_{Any\_SGW}$ of the Security Gateway SGW of the operator. Such connection is terminated on the SGW of the "nearest" IAR node (e.g. based on the internal network routing protocol). Such IAR node assumes the role of the $IAR_{HOME}$ node for MS.

The MS is registered on $SGW_{HOME}$ node, and the MS and the $SGW_{HOME}$ node activate a Security Association SA through the IPSec protocol and create the ESP IPSec tunnel. Subsequently, the $SGW_{HOME}$ node assigns the IP address $IP_{MS}$ to the mobile terminal from an IP pool, which is announced in the intra-domain routing protocol of the operator. Additionally, the $SGW_{HOME}$ node assigns a 32-bit Security Parameter Index SPI, which holds in a first field a number identifying the $SGW_{HOME}$ node and in a second field a number that identifies in univocal way the SA.

The MS is now able to activate a session on the IP network, wherein the application traffic is encapsulated in the IPSec tunnel with the SGS having the IP address $IP_{Any\_SGW}$ (see e.g. FIG. 3). In turn, the $IAR_{HOME}$ node will verify the correctness of the SA in the Security Database and route the traffic to the IP address $IP_{MS}$ of the mobile terminal over the ESP tunnel ESP. Moreover, the MS and the $SGW_{HOME}$ node exchange periodically Keepalive packets in the same tunnel.

Handover from $IAR_{HOME}$ to $IAR_{VISITED}$

When the MS moves away from the routing area of the $IAR_{HOME}$ node to a routing area of a different IAR node, the MS connects to a new AP and, after being re-authenticated, receives a new valid IP address $IP_{L\_NEW}$.

The MS transmits the application traffic or Keepalive packets with the new address $IP_{L\_NEW}$ through the SA to the IP address $IP_{Any\_SGW}$. Such traffic will be routed by the access network toward the SGW of the $IAR_{VISITED}$ node, which is responsible for the routing area to which the MS has moved.

When the $SGW_{VISITED}$ node receives the packets from MS, it identifies such terminal through the SPI field, and requests the secure SA context from the $IAR_{HOME}$ node. Alternatively the $IAR_{VISITED}$ node may already have such context if a proactive replication of the contexts has been activated.

The $IAR_{VISITED}$ node registers its identity as the node responsible for the communication of the MS, and stores its address as additional information for the session context at the $IAR_{HOME}$ node. Alternatively, the $IAR_{HOME}$ node may record such address at the moment of a request of the SA information from the $IAR_{VISITED}$ node.

At this moment the $IAR_{VISITED}$ node has the SA context information available and is able to forward the traffic to the destination network.

The $IAR_{VISITED}$ node announces also the IP address $IP_{MS}$ of the MS as "/32" (i.e. host-specific) prefix in the intra-domain routing protocols of the network in order to allow correct routing of the traffic from the network toward the mobile terminal.

Handover from $IAR_{VISITED\_Old}$ to $IAR_{VISITED\_New}$

The MS may move from the routing area of an $IAR_{VISITED}$ node, denoted in the following $IAR_{VISITED\_Old}$, to a routing area of a new $IAR_{VISITED}$ node, designated in the following as $IAR_{VISITED\_New}$. In this case, the MS connects to a new AP and, after being re-authenticated, receives a new IP address $IP_{L\_NEW}$.

With the new IP address $IP_{L\_NEW}$, the MS transmits its application traffic or Keepalive packets through the SA to the IP address $IP_{Any\_SGW}$. Such traffic will reach the SGW (i.e. $SGW_{VISITED\_New}$) of the $IAR_{VISITED\_New}$ node.

When the $SGW_{VISITED\_New}$ node receives the packets from MS, it identifies the terminal through the SPI field, and requests the secure SA context from the $IAR_{HOME}$ node. Alternatively the $IAR_{VISITED}$ node may already have such context if a proactive replication of the contexts has been activated. In any case, the $SGW_{VISITED\_New}$ node receives also the identity of the $IAR_{VISITED\_Old}$ node which was responsible for the MS.

The $IAR_{VISITED\_New}$ node registers its identity in the context of the MS at the $IAR_{HOME}$ node or the update is performed directly by the $IAR_{HOME}$ node at the moment of a request from the $IAR_{VISITED}$ node.

The $IAR_{VISITED\_New}$ node has the SA context information available and is able to forward the traffic to the destination network.

The $IAR_{VISITED\_New}$ node notifies the $IAR_{VISITED\_Old}$ node that it is now responsible for the MS and that it has to deactivate the announcement of the "/32" prefix of the MS and that it may delete the SA context information.

The $IAR_{VISITED\_NEW}$ node announces also the IP address $IP_{MS}$ of the MS as host-specific "/32" prefix in the intra-domain routing protocols of the network in order to allow correct routing of the traffic from the network toward the mobile terminal.

Handover from $IAR_{VISITED}$ to $IAR_{HOME}$

The MS may move again in the routing area of the $IAR_{HOME}$ node. In this case, the MS connects to a new AP and, after being re-authenticated, receives a new IP address $IP_{L\_NEW}$.

The MS transmits its application traffic or Keepalive packets now with the new IP address $IP_{L\_NEW}$ through the SA to the IP address $IP_{Any\_SGW}$. Such traffic will reach the SGW (i.e. $SGW_{HOME}$) of the $IAR_{HOME}$ node.

When the $SGW_{HOME}$ node receives the packets from MS, it identifies the terminal through the SPI field, recognizes its own role as $IAR_{HOME}$ node and activates the secure SA context present in its database.

Moreover, the $IAR_{HOME}$ node notifies the preceding $IAR_{VISITED}$ node that it has to deactivate the announcement of the host-specific prefix of the MS and that it may delete the SA context information. Additionally, the $IAR_{HOME}$ node may also cancel the information on the identity of the $IAR_{VISITED}$ node in the context of MS in its database.

Finally, the $IAR_{HOME}$ node is again able to forward the respective traffic to the MS.

Handover within a Same Routing Area

If a MS moves and connects to a new AP that belongs to the same routing area (i.e. the same IAR node), it may receive, after being re-authenticated, a new IP address $IP_{L\_NEW}$.

The MS now transmits its application traffic or Keepalive packets with the new IP address $IP_{L\_NEW}$ through the SA to the IP address $IP_{Any\_SGW}$. Such traffic will still reach the same IAR node, which controls the routing area in which the MS moves.

When the $SGW_{HOME}$ node receives the packets from MS, it identifies the terminal through the SPI field, and recognizes that is already has the secure SA context present in its database.

The IAR node is therefore able to continue to forward the respective traffic to the MS.

Explicit Deactivation of the Secure Access Context

The MS sends of "Context Release" message to the IAR node to which it is currently connected.

The IAR node receives this message and cancels the SA context of the MS in its database. In case the IAR node is not the $IAR_{HOME}$ home node, it will deactivate the announcement of the host-specific prefix and notify the deactivation also to the $IAR_{HOME}$ node that will handle in turn the cancellation of the original context.

Implicit Deactivation of the Secure Access Context

In the absence of consumer traffic or Keepalive packets and at a given Timeout associated with the MS, the IAR node will cancel the SA context of the MS in its database. In case the IAR node is not the $IAR_{HOME}$ home node, it will deactivate the announcement of the hot-specific prefix and notify the deactivation also to the $IAR_{HOME}$ node that will handle in turn the cancellation of the original context.

Without prejudice to the underlying principles of the invention, the details and the embodiments may vary, even appreciably, with reference to what has been described by way of example only, without departing from the scope of the invention as defined by the annexed claims.

The invention claimed is:

1. A method of providing access of a mobile terminal to an IP network via a plurality of routers having security gateways, the method including:
   establishing a connection between said mobile terminal and an access point associated with a first access network,
   establishing a security association between said mobile terminal and a first security gateway of a first router in said plurality of routers,
   associating an IP address to said mobile terminal and providing said mobile terminal having associated said IP address access to said IP network via said first access network and said first router, wherein a first data exchanged between said mobile terminal having associated said IP address and said first router is encapsulated by using said security association,
   responsive to establishing a connection between said mobile terminal and an access point associated with a second access network, determining that said mobile terminal has attempted to access said IP network via said second access network and at least one second router in the plurality of routers instead of via said access point associated with said first access network and said at least one first router, said at least one second router having a second security gateway different from said first security gateway,
   making said security association available to said at least one second router in said plurality of routers, and
   providing said mobile terminal having associated said IP address access to said IP network via said at least one access points associated with said second access network and said at least one second router, wherein a second data exchanged between said mobile terminal having associated said IP address and said at least one second router is encapsulated by using said security association made available to said at least one second router, and wherein:
   establishing said security association between said mobile terminal and said first security gateway includes assigning a Security Parameter Index to said security association, said Security Parameter Index identifying univocally said first security gateway and said security association;

making said security association available to said at least one second router includes making said Security Parameter Index available to said at least one second router to enable said at least one second router to have access to said security association; and encapsulating said second data using said security association includes encrypting said second data using said security association and creating a data packet comprising said Security Parameter Index and said encrypted second data.

2. The method of claim 1, wherein determining that said mobile terminal has attempted to access said IP network via said at least one second router includes receiving at said second security gateway a data packet from said mobile terminal, said data packet comprising said Security Parameter Index whereby said second security gateway identifies said first security gateway based on said Security Parameter Index, and wherein making said security association available to said at least one second router in said plurality of routers includes, subsequent to determining said attempt, requesting and obtaining said security association at said second security gateway from said first security gateway.

3. The method of claim 1, wherein making said security association available to said at least one second router includes:
prior to determining that said mobile terminal has attempted to access said IP network via said access point of said second access network and said at least one second router, identifying at least one candidate security gateway to become said second security gateway and transmitting said security association from said first security gateway to said at least one said candidate security gateway.

4. The method of claim 1, including announcing a host-specific prefix of said IP address at said at least one second router in intra-domain routing protocols.

5. The method of claim 1, wherein said IP address is a mobile IP address as specified by a Mobile IP protocol and wherein a notification is sent to said first router so that data destined for said mobile terminal is routed from said first router to said second router.

6. The method of claim 1, including:
announcing at said at least one second router intra-domain routing protocols and a host-specific prefix of said IP address if a number of host-specific routes is below a predetermined threshold, and
sending a notification to said first router so that said data destined for said mobile terminal is routed from said first router to said at least one second router if said threshold is exceeded.

7. The method of claim 1, including:
assigning an anycast IP address to said security gateways of said plurality of routers, and
establishing an IP connection between said mobile terminal and one security gateway out of said security gateways by said anycast IP address.

8. The method of claim 1, wherein the method further includes:
determining that said mobile terminal has attempted to access said IP network via an access point of a third access network and at least one third router in the plurality of routers instead of via said access point of said first access network and said at least one first router and said access point of said second access network and said at least one second router, said at least one third router having a third security gateway different from said first security gateway and different from said second security gateway,
making said security association available to said at least one third router in said plurality of routers, and
providing said mobile terminal having associated said IP address access to said IP network via said at least one third router, wherein a third data exchanged between said mobile terminal having associated said IP address and said at least one third router is encapsulated by using said security association made available to said at least one third router.

9. The method of claim 8, wherein determining that said mobile terminal has attempted to access said IP network via at least one third router includes:
receiving at said third security gateway a data packet from said mobile terminal, said data packet comprising a Security Parameter Index whereby said third security gateway identifies said first security gateway based on said Security Parameter Index, and
requesting and obtaining said security association at said third security gateway from said first security gateway.

10. The method of claim 8, including:
announcing a host-specific prefix of said IP address at said at least one second router in intra-domain routing protocols,
deactivating said announcing the host-specific prefix of said IP address at said second router, and
announcing the host-specific prefix of said IP address at said at least one third router in the intra-domain routing protocols.

11. The method of claim 10, wherein an identifier of said second security gateway is stored in a database associated to said first security gateway, and wherein said deactivating said announcing at said second security gateway includes:
requesting from said first security gateway said identifier of said second security gateway,
sending a notification to said second security gateway, and
stopping said announcing at said second security gateway.

12. The method of claim 1, wherein providing said mobile terminal access to said IP network via said at least one second router does not change said IP address associated to said mobile terminal.

13. The method of claim 1, wherein determining that said mobile terminal has attempted to access said IP network via at least one second router in the plurality of routers instead of via said at least one first router includes determining that said mobile terminal has moved from an access area served by an access point associated with the first router.

14. A network for providing a mobile terminal access to an IP network, via a plurality of access points and a plurality of routers wherein each router has a security gateway, said plurality of access points and plurality of routers each comprising at least one computer being configured to:
establish a connection between said mobile terminal and an access point of a first access network;
establish a security association between said mobile terminal and a first security gateway of a first router in said plurality of routers;
associate an IP address to said mobile terminal and provide said mobile terminal having associated said IP address access to said IP network via said first access network and said first router, wherein a first data exchanged between said mobile terminal having associated said IP address and said first router is encapsulated by using said security association;

in response to establishing a connection between said mobile terminal and an access point associated with a second access network, determine that said mobile terminal has attempted to access said IP network via said second access network and at least one second router in the plurality of routers instead of via said first access network and said first router, said at least one second router having a second security gateway different from said first security gateway;

make said security association available to at least one second router in said plurality of routers, said at least one second router having a second security gateway; and provide said mobile terminal having associated said IP address access to said IP network via said at least one second router, wherein a second data exchanged between said mobile terminal having associated said IP address and said at least one second router is encapsulated by using said security association made available to said at least one second router, wherein establishing said security association between said mobile terminal and said first security gateway includes assigning a Security Parameter Index to said security association, said Security Parameter Index identifying univocally said first security gateway and said security association;

wherein encapsulating said second data using said security association includes encrypting said second data using said security association and creating a data packet comprising said Security Parameter Index and said encrypted second data; and wherein making said security association available to said at least one second router includes making said Security Parameter Index available to said at least one second router to enable said at least one second router to have access to said security association.

15. The network of claim 14, wherein said access point of said first access network is a WiFi or WIMax access point and said access point of said second access network is a 2G or 3G base-station.

16. The network of claim 14, wherein providing said mobile terminal access to said IP network via said first router includes providing access via said access point of the first access network using a first access technology, and wherein providing said mobile terminal having associated said IP address access to said IP network via said at least one second router instead of via said first router includes providing access via said access point of the second access network using a second access technology different from said first access technology.

17. The network of claim 14, wherein determining that said mobile terminal has attempted to access said IP network via at least one second router in the plurality of routers instead of via said at least one first router includes determining that said mobile terminal has moved from an access area served by an access point associated with the first router.

18. A non-transitory computer readable medium having software code thereon, which when executed by at least one computer causes the at least one computer to:

establish a connection between a mobile terminal and an access point associated with a first access network;

establish a security association between said mobile terminal and a first security gateway of a first router in a plurality of routers;

associate an IP address to said mobile terminal and provide said mobile terminal having associated said IP address access to an IP network via said first access network and said first router, wherein a first data exchanged between said mobile terminal having associated said IP address and said first router is encapsulated by using said security association;

in response to establishing a connection between said mobile terminal and an access point associated with a second access network, determine that said mobile terminal has attempted to access said IP network via said second access network and at least one second router in the plurality of routers instead of via said first access network and said first router, said at least one second router having a second security gateway different from said first security gateway;

make said security association available to at least one second router in said plurality of routers, said at least one second router having a second security gateway; and provide said mobile terminal having associated said IP address access to said IP network via said at least one second router, wherein a second data exchanged between said mobile terminal having associated said IP address and said at least one second router is encapsulated by using said security association made available to said at least one second router, wherein establishing said security association between said mobile terminal and said first security gateway includes assigning a Security Parameter Index to said security association, said Security Parameter Index identifying univocally said first security gateway and said security association;

wherein encapsulating said second data using said security association includes encrypting said second data using said security association and creating a data packet comprising said Security Parameter Index and said encrypted second data; and wherein making said security association available to said at least one second router includes making said Security Parameter Index available to said at least one second router to enable said at least one second router to have access to said security association.

19. The non-transitory computer readable medium of claim 18, wherein determining that said mobile terminal has attempted to access said IP network via at least one second router in the plurality of routers instead of via said at least one first router includes determining that said mobile terminal has moved from an access area served by an access point associated with the first router.

* * * * *